(12) United States Patent
Ueda et al.

(10) Patent No.: US 6,932,699 B2
(45) Date of Patent: Aug. 23, 2005

(54) GAME DEVICE, GAME REGION EXPANSION AND CONTRACTION METHOD, GAME PROGRAM AND INFORMATION STORAGE MEDIUM

(75) Inventors: Mitsuhisa Ueda, Tokyo (JP); Tatsuto Yabe, Tokyo (JP); Isao Matsuoka, Tokyo (JP); Tadaaki Tsunashima, Tokyo (JP)

(73) Assignee: Konami Corporation, Tokyo (JP)

(*) Notice: Subject to any disclaimer, the term of this patent is extended or adjusted under 35 U.S.C. 154(b) by 232 days.

(21) Appl. No.: 10/137,425

(22) Filed: May 3, 2002

(65) Prior Publication Data

US 2002/0173351 A1 Nov. 21, 2002

(30) Foreign Application Priority Data

May 16, 2001 (JP) ..................... 2001-147096

(51) Int. Cl.$^7$ ............................... A63F 13/00
(52) U.S. Cl. ......................................... 463/9
(58) Field of Search ...................... 463/9; 345/342

(56) References Cited

U.S. PATENT DOCUMENTS

| | | | | |
|---|---|---|---|---|
| 5,312,113 A | * | 5/1994 | Ta-Hsien et al. | 463/9 |
| 5,643,085 A | * | 7/1997 | Aityan et al. | 463/9 |
| 5,847,706 A | * | 12/1998 | Kingsley | 345/788 |
| 6,011,551 A | * | 1/2000 | Amro | 345/788 |
| 6,206,372 B1 | * | 3/2001 | Harris | 273/153 S |
| 6,251,012 B1 | * | 6/2001 | Horigami et al. | 463/7 |
| 6,267,676 B1 | * | 7/2001 | Nagaoka | 463/43 |
| 6,332,838 B1 | * | 12/2001 | Yamagami | 463/9 |
| 6,352,475 B1 | * | 3/2002 | Mraovic | 463/9 |
| 6,683,617 B1 | | 1/2004 | Naoi et al. | |
| 2002/0191026 A1 | * | 12/2002 | Rodden et al. | 345/779 |

FOREIGN PATENT DOCUMENTS

| | | |
|---|---|---|
| EP | 0 635 781 A1 | 1/1995 |
| EP | 0 886 260 A2 | 12/1998 |
| JP | 2001-005989 A | 1/2001 |
| JP | 2001-147096 | 5/2001 |

OTHER PUBLICATIONS

Cowart, Robert, Mastering Windows 3.1 pp. 5–42 and 804 (1993).*
Rules on how to play Sin City: simcity3000unlimited.ea.com.*
Kuntz, Margy, Teacher Guide: An Educational Companion for SimCity 3000 (1999).*
Description of RollerCoaster Tycoon: guidesarchive.ign-.com.*

* cited by examiner

*Primary Examiner*—Michael O'Neill
(74) *Attorney, Agent, or Firm*—Sughrue Mion, PLLC

(57) ABSTRACT

A method and apparatus for a game that makes it possible to freely establish a region by expanding or contracting various regions relating to a game with a simple operation. If a closed region for expansion or contraction is moved to a position adjacent to an already established expansion or contraction object region, and an expansion operation performed in a state where a boundary of the closed region for expansion or contraction and a boundary of the object region, the closed region for expansion or contraction is added to the original object region to enlarge the area of the object region. Thus, the boundary displayed overlapping on the object region and the closed region for expansion or contraction are removed, and a single linked boundary is formed on the new object region.

4 Claims, 17 Drawing Sheets

FIG. 7
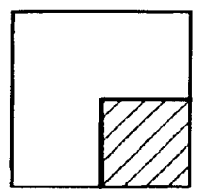 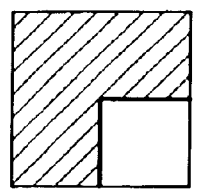 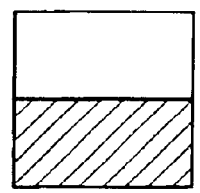 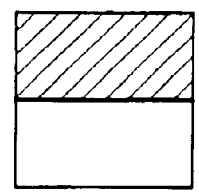
No. 0   No. 1   No. 2   No. 3
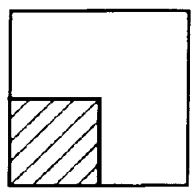 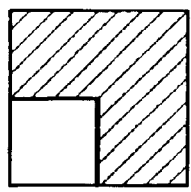 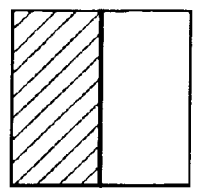 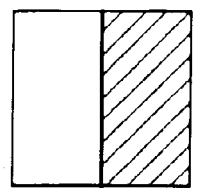
No. 4   No. 5   No. 6   No. 7
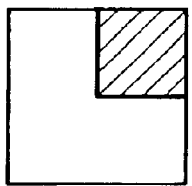 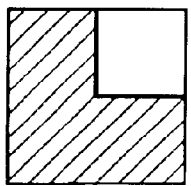 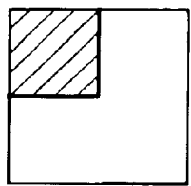 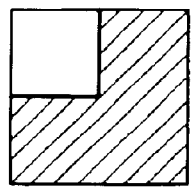
No. 8   No. 9   No.10   No.11
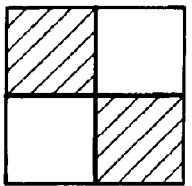 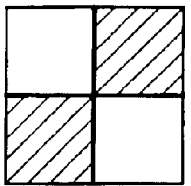 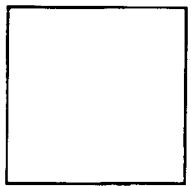 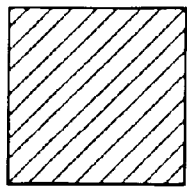
No.12   No.13   No.14   No.15

| 01 | 02 | 03 | 04 | 05 |
|----|----|----|----|----|
| 06 | 07 | 08 | 09 | 10 |
| 11 | 12 | 13 | 14 | 15 |
| 16 | 17 | 18 | 19 | 20 |
| 21 | 22 | 23 | 24 | 25 |

FIG. 10

| CELL ID | CELL ATTRIBUTE NO. |
|---|---|
| 01 | No. 0 |
| 02 | No. 2 |
| 03 | No. 2 |
| 04 | No. 2 |
| 05 | No. 5 |
| 06 | No. 7 |
| 07 | No.15 |
| 08 | No.15 |
| 09 | No.15 |
| 10 | No. 6 |
| 11 | No. 7 |
| 12 | No.15 |
| 13 | No.15 |
| 14 | No.15 |
| 15 | No. 6 |
| 16 | No. 7 |
| 17 | No.15 |
| 18 | No.15 |
| 19 | No.15 |
| 20 | No. 6 |
| 21 | No. 8 |
| 22 | No. 3 |
| 23 | No. 3 |
| 24 | No. 3 |
| 25 | No.10 |

| CELL ID | CELL CO-ORDINATES | CELL ATTRIBUTE NO. |
|---------|-------------------|--------------------|
| 0001    | ( _ , _ )         | No. 14             |
| 0002    | ( _ , _ )         | No. 14             |
| 0003    | ( _ , _ )         | No. 0              |

FIG. 13

CELL ATTRIBUTE OF FIXED CELL

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | -1 | 15 | -1 | 5 | 2 | -1 | 9 | -1 | 7 | -1 | 12 | -1 | -1 | 11 | 0 | -1 |
| 1 | 15 | -1 | 15 | -1 | -1 | -1 | -1 | -1 | -1 | -1 | -1 | -1 | -1 | -1 | -1 | -1 |
| 2 | -1 | -1 | -1 | 15 | -1 | -1 | -1 | -1 | 11 | -1 | 9 | -1 | -1 | -1 | 2 | -1 |
| 3 | 5 | -1 | 15 | -1 | -1 | -1 | -1 | -1 | -1 | -1 | -1 | -1 | -1 | -1 | 3 | -1 |
| 4 | 2 | -1 | -1 | -1 | -1 | 15 | -1 | 11 | 13 | -1 | 6 | -1 | 9 | -1 | 4 | -1 |
| 5 | -1 | -1 | -1 | -1 | 15 | -1 | -1 | -1 | -1 | -1 | -1 | -1 | -1 | -1 | 5 | -1 |
| 6 | 9 | -1 | -1 | -1 | -1 | -1 | 15 | -1 | -1 | -1 | -1 | -1 | -1 | -1 | 6 | -1 |
| 7 | -1 | -1 | -1 | -1 | -1 | -1 | -1 | 15 | -1 | -1 | 5 | -1 | -1 | -1 | 7 | -1 |
| 8 | 7 | -1 | 11 | -1 | 13 | -1 | -1 | -1 | 15 | 3 | -1 | 5 | -1 | -1 | 8 | -1 |
| 9 | -1 | -1 | -1 | -1 | -1 | -1 | -1 | 15 | -1 | -1 | -1 | -1 | -1 | -1 | 9 | -1 |
| 10 | 12 | -1 | 9 | -1 | 6 | -1 | -1 | 5 | 3 | -1 | -1 | 15 | -1 | -1 | 10 | -1 |
| 11 | -1 | -1 | -1 | -1 | -1 | -1 | -1 | -1 | 15 | -1 | -1 | -1 | -1 | -1 | 11 | -1 |
| 12 | -1 | -1 | -1 | -1 | -1 | 9 | -1 | -1 | 5 | -1 | -1 | -1 | 15 | 12 | -1 | -1 |
| 13 | 11 | -1 | -1 | -1 | -1 | -1 | -1 | -1 | -1 | -1 | -1 | -1 | 15 | -1 | 13 | -1 |
| 14 | 0 | 1 | 2 | 3 | 4 | 5 | 6 | 7 | 8 | 9 | 10 | 11 | 12 | 13 | -1 | -1 |
| 15 | -1 | -1 | -1 | -1 | -1 | -1 | -1 | -1 | -1 | -1 | -1 | -1 | -1 | -1 | -1 | -1 |

CELL ATTRIBUTE OF MOBILE CELL

F I G. 16a
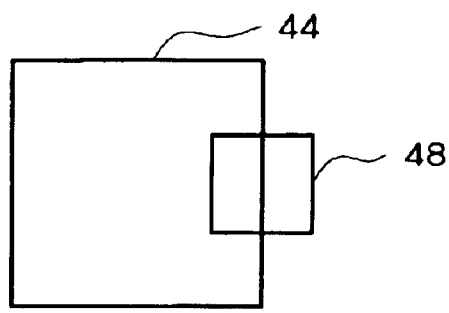
F I G. 16b
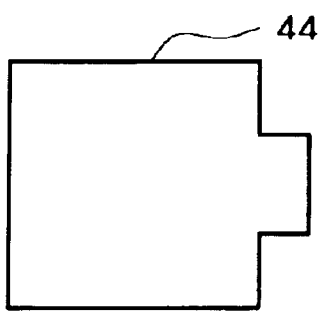

FIG. 18

| CELL ATTRIBUTE OF MOBILE CELL \ CELL ATTRIBUTE OF FIXED CELL | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0  | 0  | 15 | 2  | 5  | 2  | 5  | 9  | 7  | 7  | 9  | 12 | 11 | 12 | 11 | 0  | 15 |
| 1  | 15 | 1  | 15 | 1  | 1  | 15 | 1  | 15 | 1  | 15 | 1  | 15 | 15 | 1  | 1  | 15 |
| 2  | 2  | 15 | 2  | 15 | 2  | 15 | 9  | 11 | 11 | 9  | 9  | 11 | 9  | 11 | 2  | 15 |
| 3  | 5  | 1  | 15 | 3  | 1  | 5  | 1  | 5  | 3  | 15 | 3  | 15 | 5  | 1  | 3  | 15 |
| 4  | 2  | 1  | 2  | 1  | 4  | 15 | 6  | 11 | 13 | 9  | 6  | 11 | 9  | 13 | 4  | 15 |
| 5  | 5  | 15 | 15 | 5  | 15 | 5  | 15 | 5  | 5  | 15 | 5  | 15 | 5  | 15 | 5  | 15 |
| 6  | 9  | 1  | 9  | 1  | 6  | 15 | 6  | 15 | 1  | 9  | 6  | 15 | 9  | 1  | 6  | 15 |
| 7  | 7  | 15 | 11 | 5  | 11 | 5  | 15 | 7  | 7  | 15 | 5  | 11 | 5  | 11 | 7  | 15 |
| 8  | 7  | 1  | 11 | 3  | 13 | 5  | 1  | 7  | 8  | 15 | 3  | 11 | 5  | 13 | 8  | 15 |
| 9  | 9  | 15 | 9  | 15 | 9  | 15 | 9  | 15 | 15 | 9  | 9  | 15 | 9  | 15 | 9  | 15 |
| 10 | 12 | 1  | 9  | 3  | 6  | 5  | 6  | 5  | 3  | 9  | 10 | 15 | 12 | 1  | 10 | 15 |
| 11 | 11 | 15 | 11 | 15 | 11 | 15 | 15 | 11 | 11 | 15 | 15 | 11 | 11 | 11 | 11 | 15 |
| 12 | 12 | 15 | 9  | 5  | 9  | 5  | 9  | 5  | 5  | 9  | 12 | 15 | 12 | 15 | 12 | 15 |
| 13 | 11 | 1  | 11 | 1  | 13 | 15 | 1  | 11 | 13 | 15 | 1  | 11 | 15 | 13 | 13 | 15 |
| 14 | 0  | 1  | 2  | 3  | 4  | 5  | 6  | 7  | 8  | 9  | 10 | 11 | 12 | 13 | 14 | 15 |
| 15 | 15 | 15 | 15 | 15 | 15 | 15 | 15 | 15 | 15 | 15 | 15 | 15 | 15 | 15 | 15 | 15 |

GAME DEVICE, GAME REGION EXPANSION AND CONTRACTION METHOD, GAME PROGRAM AND INFORMATION STORAGE MEDIUM

BACKGROUND OF THE INVENTION

The present invention relates to a game device, a region expansion and contraction method for a game, a game program and an information storage medium, and particularly relates to technology for expanding or contracting various regions involved in a game with a simple operation.

Various games have been proposed where if a player sets any region in a game space, game progress related to that region is controlled. For example, in an urban development simulation game, if a player sets a construction region in a game space, buildings etc. are constructed in that region.

In this type of game, when a region is set on a game screen, a method can initially be considered where the width and shape of setting regions are predetermined, and only an arbitrary few of these regions are arranged at arbitrary positions on the game screen (game field). A method of arbitrarily determining the width, shape and position of setting regions using a pointing device such as a mouse can also be considered.

However, with the first of these two methods, the setting regions themselves can not be expanded or contracted because the width and shape of the setting regions are determined in advance and each region is handled separately. This means that if the width, shape and position are arbitrarily determined by a player, there is a problem that it is not possible to implement a game where a story unfolds according to those regions.

Also, with the second of these two methods, because a pointing device such as a mouse is required, there is a problem that it is not suitable for a game device with poor operating means, for example, a portable game machine.

The present invention has been conceived in view of the above described problems, and an object of the invention is to provide a game device, an expansion and contraction method for a game, a game program and an information storage medium, that are capable of establishing regions freely by expansion or contraction of various regions relating to a game with a simple operation.

SUMMARY OF THE INVENTION

In order to solve the above described problems, a game device of the present invention comprises: expansion or contraction object region display means for displaying an expansion or contraction object region, being an object for region expansion due to region addition or for region contraction due to region removal, on the game screen; closed region for expansion or contraction display means for displaying a closed region for expansion or contraction, to be added to the expansion or contraction object region or to be removed from the expansion or contraction object region, on the game screen; position changing means for changing a relative position of the closed region for expansion or contraction with respect to the expansion or contraction object region in accordance with a command from a player; expanded or contracted region determining means for determining expanded or contracted regions, by adding a portion of the closed region for expansion or contraction that does not overlap the expansion or contraction object region to the expansion or contraction object region, or removing a portion of the closed region for expansion or contraction that overlaps the expansion or contraction object region from the expansion or contraction object region, when the closed region for expansion or contraction comes into contact with the expansion or contraction object region; and expanded or contracted region display means for displaying the contracted or expanded region on the game screen instead of the expansion or contraction object region.

According to the present invention, an expansion or contraction object region and a closed region for expansion or contraction are displayed on a game screen. It is possible for a player to instruct changing of a relative position of the closed region for expansion and contraction with respect to the expansion or contraction object region. In the event that the closed region for expansion or contraction comes into contact with the expansion or contraction object region (including the case where all or a part of the closed region for expansion or contraction overlaps the expansion or contraction object region), expanded or contracted regions are determined in response to the player's command. An expansion or contraction object region is constituted by adding a portion of the closed region for expansion or expansion that does not overlap the expansion or contraction object region to the expansion or contraction object region, or by removing a portion of the region closed for expansion or contraction that does overlap the expansion or contraction object region from the expansion or contraction object region. The expanded or contracted region is then displayed on the game screen instead of the expansion or contraction object region. In this way, it is possible to freely establish regions by expanding or contracting various regions relating to the game with a simple operation. It is also possible to have the present invention constructed to enable both expansion and contraction of expansion or contraction object regions, or to enable one of either expansion or contraction.

Also, with one aspect of the present invention, the expansion or contraction object region display means displays a borderline of the expansion or contraction object region on the game screen, the closed region for expansion or contraction display means displays a borderline of the closed region for expansion or contraction on the game screen, the expanded or contracted region determining means links part of each of the borderline of the expansion or contraction object region and the borderline of the closed region for expansion or contraction to determine a borderline of the expanded or contracted region, and the expanded or contracted region display means displays a determined borderline of the expanded or contracted region on the game screen. With this aspect of the present invention, borderlines of the expansion or contraction object region and the closed region for expansion or contraction are displayed on the game screen. Each part of the borderlines of the expansion or contraction object region and the closed region for expansion or contraction are then linked to determine an expanded or contracted region borderline. The borderline of this expanded or contracted region is displayed on the game screen. In this way, the appearance of expanding or contracting the expansion or contraction object region can be suitably expressed.

Also, a game device of the present invention allows development of a game involving an expansion or contraction region, included in a base region, by a player expanding or contracting the expansion or contraction object region, and comprises first cell attribute storage means for storing cell attributes representing a positional relationship of the expansion or contraction object region corresponding to each cell constituting the base region, base region display means for displaying the base region on a game screen based on cell attributes of each cell constituting the base region stored in the first cell attribute storage means, second cell attribute storage means for storing cell attributes representing a relationship of a closed region for expansion or contraction corresponding to each cell constituting the closed region for expansion or contraction, expansion or contraction mark display means for displaying an expansion or contraction position mark, representing a position for adding the closed region for expansion or contraction to the expansion or contraction object region or a position for removing the closed region for expansion or contraction from the expansion or contraction object region, on the game screen, position changing means for changing a relative position of the expansion or contraction position mark, with respect to the base region, in accordance with a command from a player, so as to generate correspondence between each cell constituting the base region and each cell constituting the closed region for expansion or contraction, new cell attribute derivation means for deriving a new cell for each cell constituting the base region based on cell attributes of each corresponding cell, and base region re-display means for displaying the base region on the game screen based on the derived new cell attributes.

According to the present invention, a base region and an expansion or contraction mark are displayed on the game screen. The base region includes an expansion or contraction object region that is an object of region expansion or region contraction. Also, an expansion or contraction position mark represents a position for adding the closed region for expansion or contraction to the expansion or contraction object region, or a position for removing the closed region for expansion or contraction from the expansion or contraction object region. The base region and the closed region for expansion or contraction are composed of cells, and a relative position of the expansion or contraction position mark with respect to the base region is changed in accordance with a command from a player, so as to generate correspondence between the cells constituting these regions. New cell attributes for each cell constituting the base region are then derived based on cell attributes of each corresponding cell. Cell attributes of each cell constituting the base region represent a relationship between that cell and the expansion or contraction object region. Also, block attributes of each cell constituting the closed region for expansion or contraction represent a relationship between that cell and the closed region for expansion or contraction. That is, new cell attributes are derived based on a relationship between the each cell constituting the base region and the expansion or contraction object region, and a relationship between each cell constituting the closed region for expansion or contraction and the closed region for expansion or contraction. With the present invention, by a player changing a relative position of an expansion or contraction position mark with respect to the base region, it is possible to expand or contract various regions relating to a game with a simple operation to freely establish regions. It is also possible to have the present invention constructed to enable both expansion and contraction of expansion or contraction object regions, or to enable only one of either expansion or contraction.

Also, one aspect of the present invention further comprises cell attribute translation table storage means for storing a cell attribute translation table made by generating correspondence between a combination of cell attributes of each cell constituting the base region and cell attributes of each block constituting the closed region for expansion or contraction, and the new cell attributes, and in this aspect the new cell attribute derivation means derives new cell attributes for each block constituting the base region based on the cell attribute conversion table. In this way, it is possible to expand or contract various regions relating to the game with comparatively simple processes.

Also, a region expansion or contraction method for a game, of the present invention comprises the steps of: displaying an expansion or contraction object region constituting an object of region expansion by region addition or region contraction by region deletion; displaying a closed region for expansion or contraction, to be added to the expansion or contraction object region or to be deleted from the expansion or contraction object region, on the game screen; changing a relative position of the closed region for expansion and contraction with respect to the expansion or contraction object region in accordance with a command from a player; determining expanded or contracted regions, by adding a portion of the closed region for expansion or contraction that does not overlap the expansion or contraction object region to the expansion or contraction object region, or removing a portion of the closed region for expansion or contraction that overlaps the expansion or contraction object region from the expansion or contraction object region, when the closed region for expansion or contraction comes into contact with the expansion or contraction object region; and displaying the expanded or contracted region on the game screen instead of the expansion or contraction object region.

According to the present invention, it is possible to expand or contract various regions relating to a game with a simple operation to freely establish regions. It is also possible to construct the present invention to enable both expansion and contraction of the expansion or contraction object region, or to enable only one of expansion or contraction.

Further, a region expansion or contraction method for a game, for expansion or contraction of an expansion or contraction region, included in a base region, by a player, comprises the steps of: storing cell attributes representing a positional relationship of the expansion or contraction object region corresponding to each cell constituting the base region; displaying the base region on the game screen based on cell attributes for each cell constituting the base region; storing cell attributes representing a relationship of a closed region for expansion or contraction corresponding to each cell constituting the closed region for expansion or contraction; displaying an expansion or contraction position mark, representing a position for adding the closed region for expansion or contraction to the expansion or contraction object region or a position for removing the closed region for expansion or contraction from the expansion or contraction object region, on the game screen; changing a relative position of the expansion or contraction position mark with respect to the base region, in accordance with a command from a player, so as to generate correspondence between each cell constituting the base region and each cell constituting the closed region for expansion or contraction; deriving new cell attributes for each cell constituting the base region, based on cell attributes of each corresponding cell; and displaying the base region on the game screen based on the derived new cell attributes.

According to the present invention, it is possible to expand or contract various regions relating to a game with a simple operation to freely establish regions. It is also possible to construct the present invention to enable both expansion and contraction of the expansion or contraction object region, or to enable only one of expansion or contraction.

Still further, a game program of the present invention causes a computer to function as: expansion or contraction object region display means for displaying an expansion or contraction object region, constituting an object of region expansion by region addition or region contraction by region removal, on the game screen; closed region for expansion display means for displaying a closed region for expansion to be added to the expansion or contraction object region, on the game screen; position changing means for changing a relative position of the region closed for expansion with respect to the expansion or contraction object region in accordance with a command from a player; expanded region determining means for determining expanded regions, by adding a portion of the region closed for expansion that does not overlap the expansion or contraction object region to the expansion or contraction object region, when the region closed for expansion comes into contact with the expansion or contraction object region; and expanded region display means for displaying the expanded region on the game screen instead of the expansion or contraction object region.

If the game program of the present invention is made to run on a computer such as a game device or the like, it is possible to expand various regions relating to the game with a simple operation to freely establish regions.

Still further, a game program of the present invention causes a computer to function as: expansion or contraction object region display means for displaying an expansion or contraction object region, constituting an object of contraction due to region removal, on the game screen; closed region for contraction display means for displaying a closed region for contraction, for removal from the expansion or contraction object region, on the game screen; position changing means for changing a relative position of the region closed for contraction with respect to the expansion or contraction object region, in accordance with a command from a player; contracted region determining means for determining a contracted region, by removing a portion of the region closed for contraction that overlaps the expansion or contraction object region from the expansion or contraction object region, when the region closed for contraction comes into contact with the expansion or contraction object region; and contracted region display means for displaying the contracted region on the game screen instead of the expansion or contraction object region.

By running the game program of the present invention on a computer such as a game device, it is possible to contract various regions relating to the game with a simple operation, to freely establish regions.

A game program of the present invention is a game program for causing a computer to function as a game device, for allowing development of a game involving an expansion or contraction region including a base region expanded or contracted by a player, comprising: first cell attribute storage means for storing cell attributes representing a positional relationship of the expansion or contraction object region corresponding to each cell constituting the base region; base region display means for displaying the base region on a game screen based on cell attributes of each cell constituting the base region stored in the first cell attribute storage means; second cell attribute storage means for storing cell attributes representing a relationship of a closed region for expansion or contraction corresponding to each cell constituting the closed region for expansion or contraction; expansion or contraction position mark display means for displaying an expansion or contraction position mark, representing a position for adding the closed region for expansion or contraction to the expansion or contraction object region or a position for removing the closed region for expansion or contraction from the expansion or contraction object region, on the game screen; position changing means for changing a relative position of the expansion or contraction position mark with respect to the base region, in accordance with a command from a player, so as to generate correspondence between each cell constituting the base region and each cell constituting the closed region for expansion or contraction; new cell attribute derivation means for deriving a new cell attribute for each cell constituting the base region based on cell attributes of each corresponding cell; and base region re-display means for displaying the base region on the game screen based on the derived new cell attributes.

If the game program of the present invention is made to run on a computer such as a game device or the like, it is possible to expand various regions relating to the game with a simple operation to freely establish regions, by a player instructing a change in a relative position of an expansion or contraction position mark with respect to a base region. It is also possible to construct the present invention to enable both expansion and contraction of the expansion or contraction object region, or to enable only one of expansion or contraction.

An information storage medium of the present invention is for storing any one of the above described game programs. Depending on the computer, such as a game device, if the above described game program is read out from the information storage medium of the present invention and executed on the computer, it is possible to expand or contract various regions relating to the game with a simple operation to freely establish regions.

BRIEF DESCRIPTION OF THE DRAWINGS

FIG. 7 is a drawing showing cell images (16 types).

FIG. 10 is a drawing showing a mobile cell attribute table.

FIG. 13 is a drawing showing one example of a cell attribute conversion table.

FIGS. 16a and 16b are schematic diagrams showing one example of region expansion processing.

FIG. 18 is a drawing showing another cell attribute conversion table (for region expansion).

PREFERRED EMBODIMENTS OF THE PRESENT INVENTION

The entire disclosure of the corresponding Japanese application 2001-147096 filed on May 16, 2001 including specification, claims, drawings and summary, is incorporated herein by reference.

Preferred embodiments of the present invention will now be described in detail based on the drawings.

A game device of this embodiment provides a game in which a player places a meadow (expansion or contraction object region) in a plain (base region) previously established in a game space, and virtually raises animals in that meadow. The object of this game is to have the animals in the meadow seen by numerous non-player game characters (game characters that are not the objects of player operations). At this time, if the player makes the area of the meadow larger, even if a lot of animals are released into the meadow, there will be no build up of stress in the animals making it possible to have a good rearing environment, but it will not be possible for the non-player game characters to see animals efficiently. Also, if a meadow that is oblong is arranged, it is made possible for the non-player game characters to efficiently see the animals in the meadow, but the animals may come into contact with the fence of the meadow (boundary line) and be injured, or it may become easier for animals to break out from the meadow. Therefore, with this game, it is necessary for the player to concentrate on the size and shape of the meadow. At this time, it becomes possible for the player to freely expand or contract a meadow (expansion or contraction object region) that has already been arranged.

Figure 1:
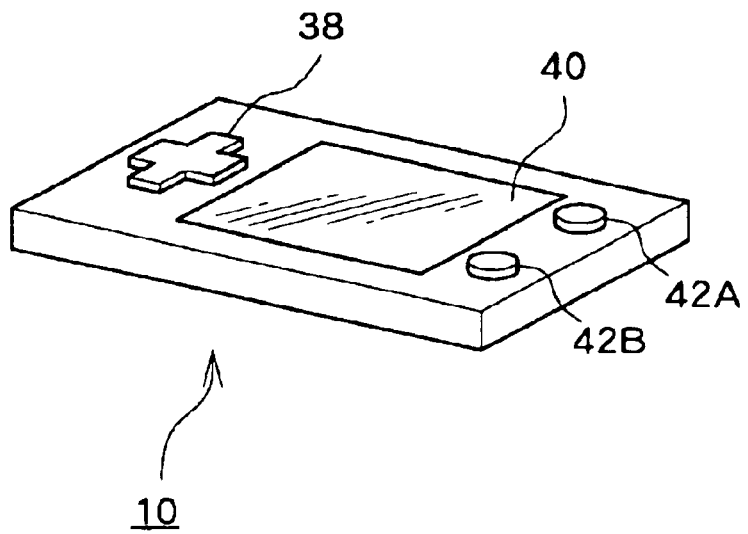
FIG. 1 is a perspective drawing showing the external appearance of a portable game machine used as a game device of an embodiment of the present invention.

FIG. 1 is a drawing showing the external appearance of a portable game machine used as a game device of this embodiment of the present invention. The game device 20 shown in this drawings has a liquid crystal display panel 40, a cross shaped key 38 and buttons 42A and 42B provided on a main surface, and under battery power a game can be enjoyed no matter where the player is. Other operational members, not shown, such as a power supply switch, are also fitted to the portable game machine 10.

Figure 2:
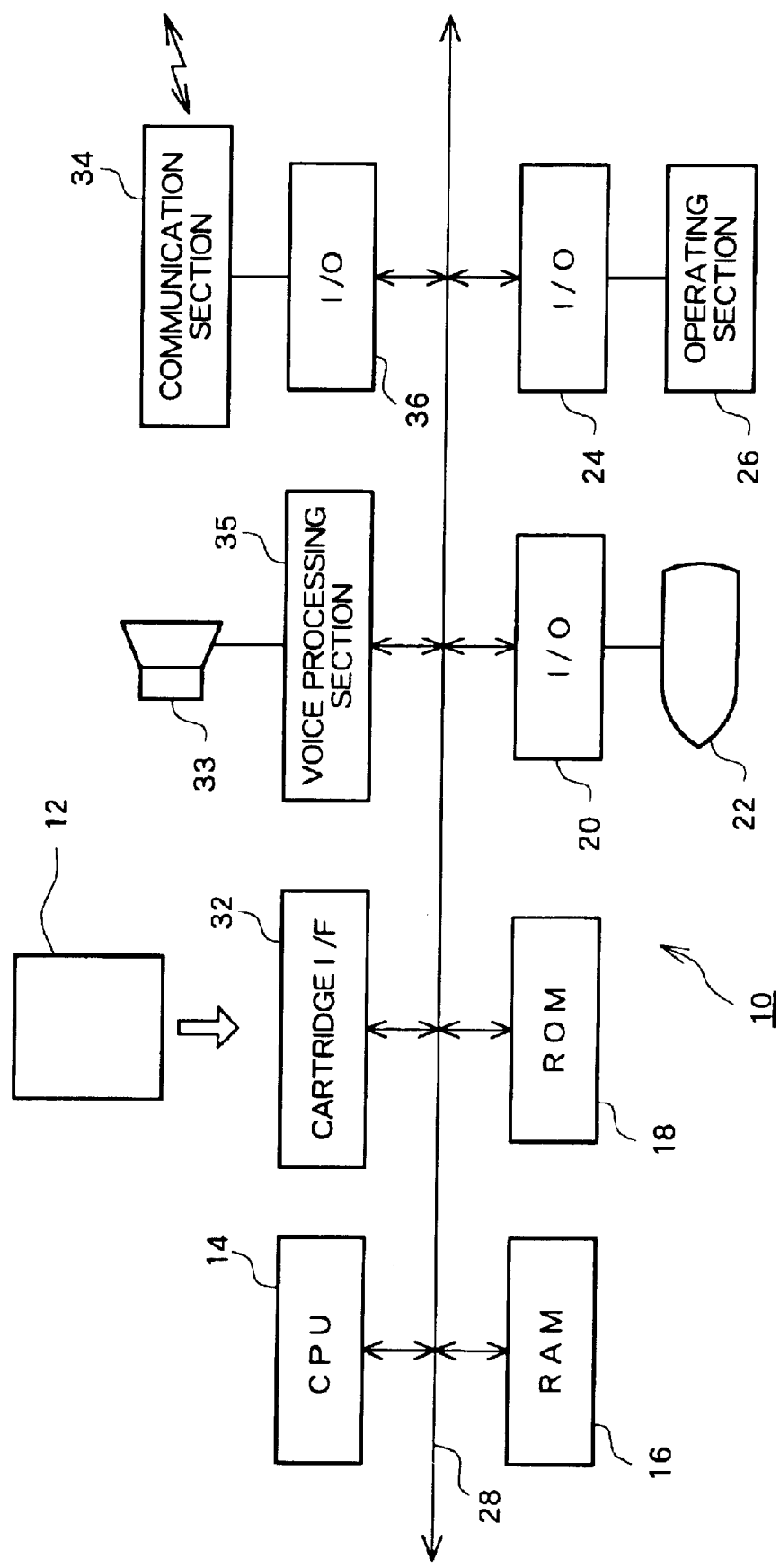
FIG. 2 is a block diagram showing the structure of the portable game machine.

FIG. 2 is a drawing showing the structure of the portable game device 10. The game device of the embodiment of the present invention has a game cartridge 12 containing a ROM (Read Only Memory) fitted into a cartridge interface 32, and a game program and game data stored in this ROM are read into the portable game machine 10 side and executed. Here, a game cartridge 12 is used to supply the game program and game data to the portable game machine 10, but it is also possible to use any other information storage medium, such as a CD-ROM (Compact Disc-Read Only Memory) or a DVD™ (Digital Versatile Disc). It is also possible to supply a game program and game data to the portable game machine 10 from a remote location via a communication network, and to supply a game program and game data to the portable game machine 10 from a floor type game machine or personal computer using various types of data communication such as infra-red communication or serial communication.

A CPU (central processing unit) 14, RAM 16, ROM 18, input output interfaces 20, 24 and 36, and voice processing section 35 are connected in the portable game machine 10 using a bus 28 to enable data communication between each of them. A communication section 34 is connected to the input output interface 36, a display 22 is connected to the input output interface 20, and an operation section 26 is connected to the input output interface 24. A speaker 33 is also connected to the voice processing section 35. These components are housed in a case together with a battery, and are driven by the battery, making the device portable.

The CPU 14 controls each of the sections of the portable game machine 10 based on an operating system (OS) stored in the ROM 18 and a game program read out from the game cartridge 12. The bus 28 is for exchange of addresses and data between each of the parts of the portable game machine 10. The game program and game data read from the game cartridge 12 are written as required into the RAM 16. Workspace for the CPU 14 is also reserved in the RAM 16. The display 22 is constructed including a liquid crystal panel 40, and displays game screens generated by the CPU 14. The voice processing section 35 outputs game sounds and sound effects generated by the CPU 14 from the speaker 33.

The input output interfaces 20, 24 and 36 respectively relay data communications between the CPU 14 and the display 22, operation section 26, cartridge reader 30 and communication section 34. The operation section 26 is input means for a player to give game instructions, and includes the cross-shaped key 38 and buttons 42A and 42B shown in FIG. 1. The cartridge reader 30 has an opening for receiving a game cartridge 12, and signal input output terminals are provided inside this opening. By pressing the game cartridge 12 into the opening, it becomes possible to exchange signals with the game cartridge 12. The communication section 34 is fitted with, for example, a communications cable, and data communication to another game device is carried out via this communication cable.

In the following, a description will be given of technology for implementing a game in which a player establishes a meadow in a plain previously established in a game space, and animals are virtually reared in this meadow, using a portable game machine 10 having the above described structure.

Figure 3:
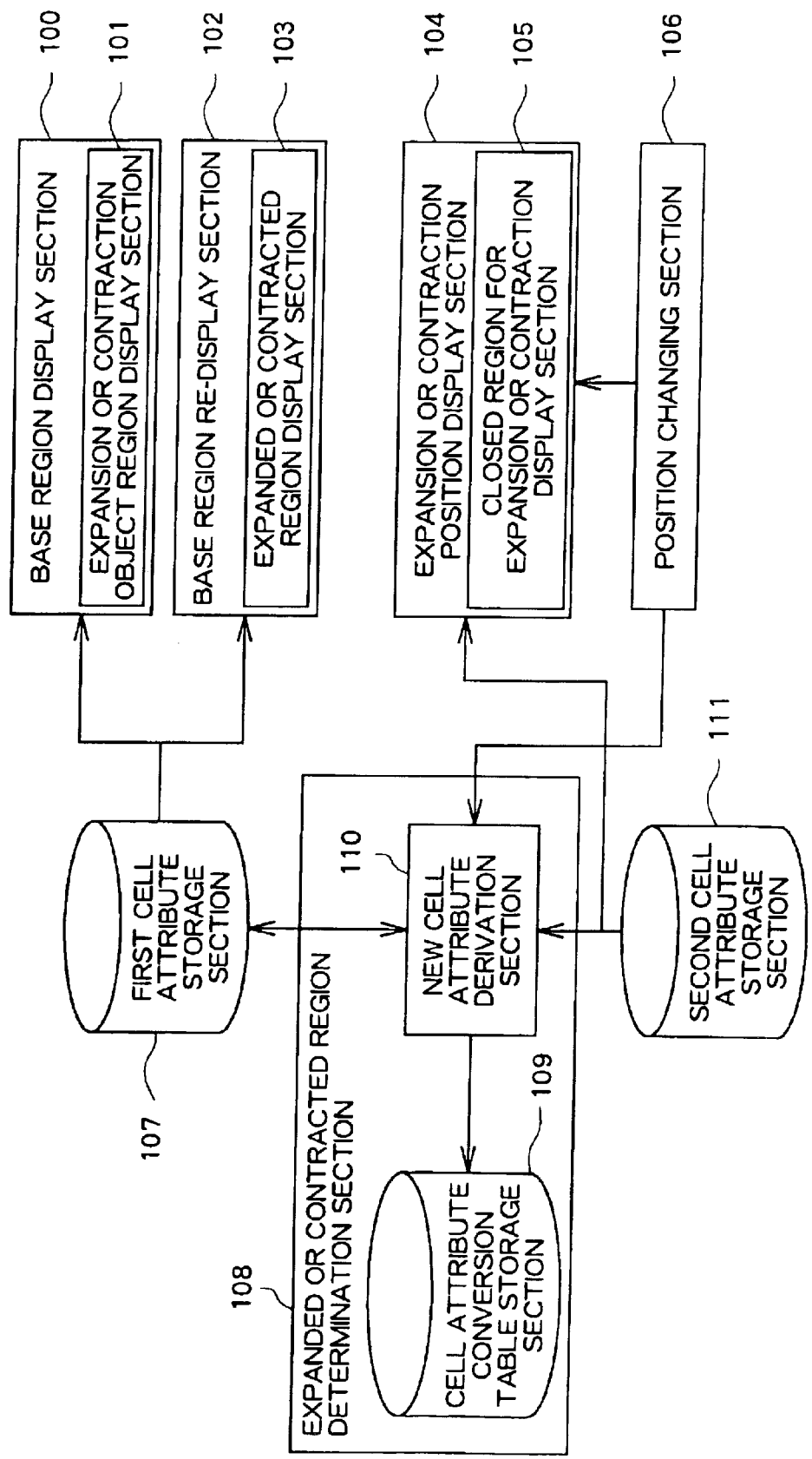
FIG. 3 is a functional block diagram mainly showing those functions executed by the portable game machine that are related to the present invention.

FIG. 3 is a functional block diagram showing those functions executed by the portable game machine 10 that are central to sections relating to the present invention. By executing a game program for advancing a game involving an expansion or contraction region as a result of a player expanding or contracting the expansion or contraction object region, included in a base region, in the portable game machine 10, the functions shown in each block of FIG. 3 are realized.

As shown in FIG. 3, a base region display section 100, base region re-display section 102, expansion or contraction position mark display section 104, position changing section 106, first cell attribute storage section 107, expanded or contracted region determination section 108 and second cell attribute storage section 111 are included in the functions realized by the portable game machine 10.

Of these sections, the base region display section 100 includes an expansion or contraction object region display section 101. Also, the base region re-display section 102 includes an expanded or contracted region display section 103, and the expansion or contraction position mark display section 104 includes a closed region for expansion or contraction display section 105. The expanded or contracted region determination section 108 also includes a cell attribute conversion table storage section 109 and a new cell attribute derivation section 110.

First of all, the expansion or contraction object region display section 101 displays an expansion or contraction object region, constituting an object of region expansion by region addition or region contraction by region removal, on the game screen. The closed region for expansion or contraction display section 105 also displays a region that is closed for expansion or contraction, to be added to the expansion or contraction object region or to be removed from the expansion or contraction object region, on the game screen. The position changing section 106 changes a relative position of the closed region for expansion and contraction, with respect to the expansion or contraction object region, in accordance with a command from a player. The expanded or contracted region determination section 108 determines expanded or contracted regions, by adding a portion of the closed region for expansion or contraction that does not overlap the expansion or contraction object region to the expansion or contraction object region, or removing a portion of the closed region for expansion or contraction that overlaps the expansion or contraction object region from the expansion or contraction object region, when the closed region for expansion or contraction comes into contact with the expansion or contraction object region. The expanded or contracted region display section 103 displays the expanded or contracted region on the game screen instead of the expansion or contraction object region.

The expansion or contraction object region display section 101 displays a borderline of the expansion or contraction object region on the game screen. The closed region for expansion or contraction display section 105 displays a borderline of the closed region for expansion or contraction on the game screen. The expanded or contracted region determination section 108 links part of each of the borderline of the expansion or contraction object region and the borderline of the closed region for expansion or contraction to determine a borderline of the expanded or contracted region. The expanded or contracted region display section 103 displays a determined borderline of the expanded or contracted region on the game screen.

The first cell attribute storage section 107 stores cell attributes representing a positional relationship of the expansion or contraction object region corresponding to each cell constituting the base region. The base region display section 100 displays the base region on a game screen based on cell attributes of each cell constituting the base region stored in the first cell attribute storage section 107. The second cell attribute storage section 111 stores cell attributes representing a relationship of a closed region for expansion or contraction corresponding to each cell constituting the closed region for expansion or contraction. The expansion or contraction position mark display section 104 displays an expansion or contraction position mark, representing a position for adding the closed region for expansion or contraction to the expansion or contraction object region or a position for removing the closed region for expansion or contraction from the expansion or contraction object region, on the game screen.

The position changing section 106, in addition to the above described function, also changes a relative position of the expansion or contraction position mark with respect to the base region, in accordance with a command from a player, so as to generate correspondence between each cell constituting the base region and each cell constituting the closed region for expansion or contraction. The new cell attribute derivation section 110 derives new cell attributes for each cell constituting the base region based on cell attributes of each corresponding cell. The base region re-display section 102 then displays the base region on the game screen based on the derived new cell attributes.

The cell attribute conversion table storage section 109 stores a cell attribute conversion table made by generating correspondence between a combination of cell attributes of each cell constituting the base region and cell attributes of each block constituting the closed region for expansion or contraction, and the new cell attributes. The new cell attribute derivation section 110 then derives new cell attributes for each block constituting the base region based on the cell attribute conversion table.

Figure 4:
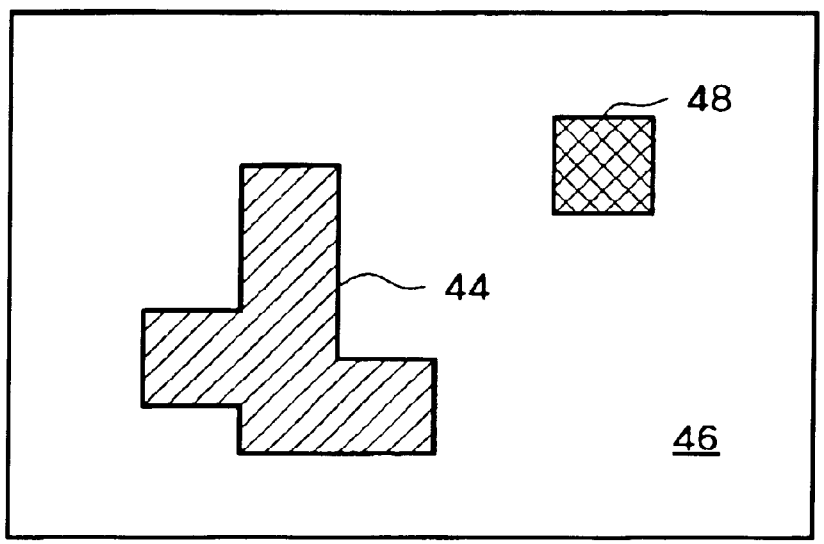
FIG. 4 is a schematic diagram showing one example of a region setting screen.

FIG. 4 shows one example of a region setting screen among game screens displayed on the display 22 of the portable game machine 10. The game setting screen shown in FIG. 4 is displayed on the display 22 using the base region display section 100 including the expansion or contraction object region display section 101, the base region re-display section 102 including the expanded or contracted region display section 103 and the expansion or contraction position mark display section 104 including the closed region for expansion or contraction display section 105 when a player establishes a meadow in a plain. With the region setting screen, first of all a plain (base region) 46 is displayed on the entire screen, and then a meadow (expansion or contraction object region) 44 is displayed on part of that plain. The meadow 44 has already been established by the player, and a fence (boundary line) is displayed around the perimeter of that meadow. A closed region for expansion or contraction 48 is also displayed on the region setting screen. The closed region for expansion or contraction 48 is a closed region narrower than the overall screen, and a fence (boundary line) is displayed at the perimeter of this closed region. Then, through operation of the position changing means 106 the player can cause the closed region for expansion or contraction 48 to an arbitrary position of the plain 46 using the cross-shaped key 38.

Figure 5A:
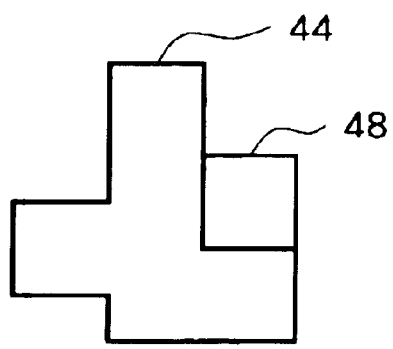
FIGS. 5a and 5b are schematic diagrams showing one example of region expansion processing.
Figure 5B:
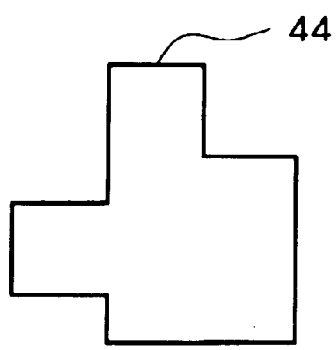

Specifically, on the region setting screen shown in FIG. 4, the player moves the closed region for expansion or contraction 48 to a position adjacent to the meadow 44 already established, using the cross-shaped key 38, and as shown in FIG. 5a, the fence of the closed region for expansion or contraction 48 and the fence of the meadow 44 overlap. In this state, if the button 42A, for example, is then pressed, the closed region for expansion or contraction 48 is added to the original meadow 44, so as to expand the area of the meadow 44, as shown in FIG. 5b. The fence around the meadow 44 at this time is updated so as to surround the periphery of the meadow 44 having the newly enlarged area. Specifically, a fence displayed overlapped on the meadow 44 and the closed region for expansion or contraction 48 is deleted, and in its place the remaining fences of the meadow 44 and the closed region for expansion or contraction 48 are connected together and displayed as a fence of the meadow 44 having the newly expanded area. The above described effect is achieved using the expanded or contracted region determination section 108 including the cell attribute conversion table storage section 109 and the new cell attribute derivation section 110.

Figure 6A:
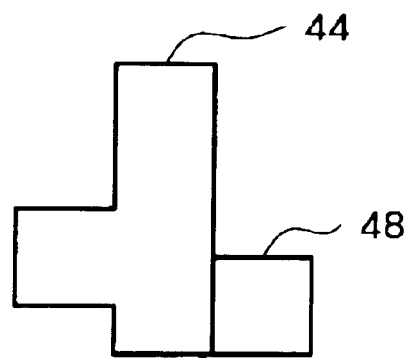
FIGS. 6a and 6b are schematic diagrams showing one example of region contraction processing.
Figure 6B:
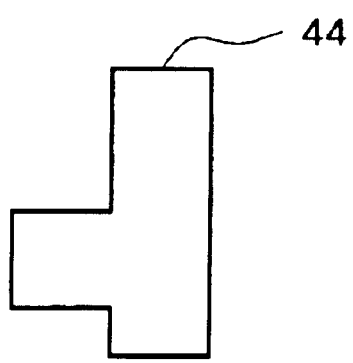

Also, on the region setting screen shown in the same drawing, the player moves the closed region for expansion or contraction 48 inside the meadow 44 already established, using the cross-shaped key 38, and as shown in FIG. 6a, the fence of the closed region for expansion or contraction 48 and the fence of the meadow 44 overlap. If, for example, the button 42B is then pressed, the closed region for expansion or contraction is deleted from the original meadow 44 so as to reduce the area, as shown in FIG. 6b. The fence of the meadow 44 at this time is updated so as to surround the meadow 44 having the newly contracted area. Specifically, a fence displayed overlapped on the meadow 44 and the closed region for expansion or contraction 48 is deleted, and in its place the remaining fences of the meadow 44 and the closed region for expansion or contraction 48 are connected together and displayed as a fence of the meadow 44 having the newly contracted area. The above described effect is also achieved using the expanded or contracted region determination section 108 including the cell attribute conversion table storage section 109 and the new cell attribute derivation section 110. Also, the closed region for expansion or contraction 48 functions as an expansion or contraction position mark for a player instructing a position where the meadow 44 is to be expanded or contracted.

When the player moves the closed region for expansion or contraction 48 using the cross-shaped key 38, the closed region for expansion or contraction 48 is moved up, down, left or right in cell units. Specifically, the closed region for expansion or contraction 48 and the plain 46 are constructed of an arbitrary combination of square cells, and fellow cells always overlap.

If the closed region for expansion or contraction 48 is then moved using the cross-shaped key 38, positions where fellow cells overlap are moved up, down, left or right one cell at a time so as to slide along. The above described effect is achieved using the position changing section 106.

FIG. 7 is a drawing showing images of cells (cell images) constituting the closed region for expansion or contraction 48 and the plain 46. The closed region for expansion or contraction 48 and the plain 46 are formed by linking the 16 types of cell image shown in FIG. 7 for display on the display 22. In each cell image, hatched portions are parts of the closed region for expansion or contraction 48 or meadow 44, and non-hatched portions are not part of the closed region for expansion or contraction 48 or the meadow 44. Bold lines represent fences. The above described cell images are managed using, for example, the base region display section 100, base region re-display section 102 and region closed for expansion or contraction display section 105.

Cell attribute numbers (No. 0–No. 15) are assigned to each cell, and a positional relationship between the cell and the closed region for expansion or contraction 48 or the meadow 44 is identified using this attribute number. The boundary of the closed region for expansion or contraction 48 and the boundary of the meadow 44 are constructed of arbitrary straight lines and 90 degree bent sections. For example, a cell having attribute No. 0 constituting the closed region for expansion or contraction 48 is arranged at a position subsuming the top left corner of the closed region for expansion or contraction 48. Also, cells having cell attribute No. 2 constituting the closed region for expansion or contraction 48 are arranged at positions subsuming part of the upper edge of the closed region for expansion or contraction 48. Cells having cell attribute No. 15 constituting the closed region for expansion or contraction 48 are arranged at the inner part of the closed region for expansion or contraction 48. Similarly, a cell having cell attribute No. 0 constituting the plain 46 is arranged at a position subsuming the upper left corner of the meadow 44.

Also, cells having cell attribute Nos. 12 and 13 constituting the plain 46 are arranged at positions where one or a plurality of angled sections of the meadow 44 are joined. Cells having cell attribute No. 14 constituting the plain 46 are arranged outside the meadow 44.

Figures 8, 9:
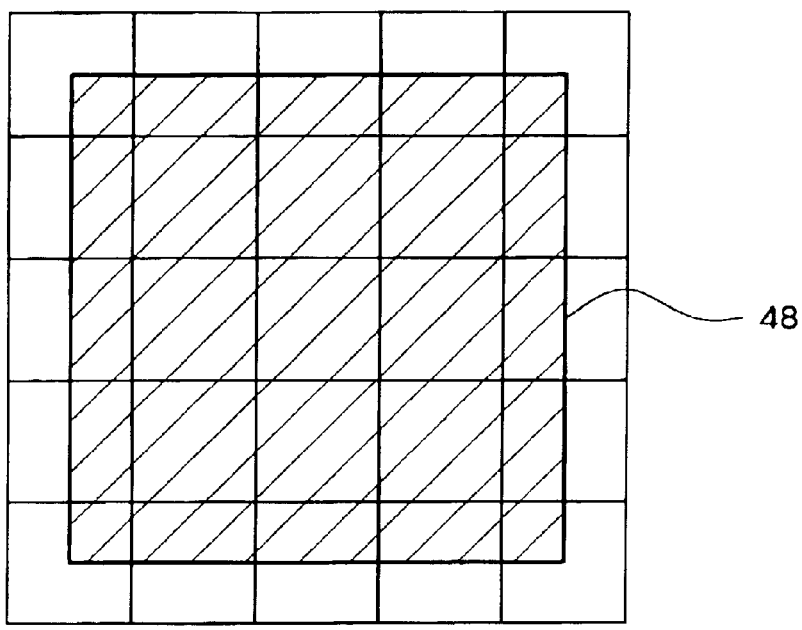
FIG. 8 is a drawing showing an image of a closed region for expansion or contraction.
FIG. 9 is a drawing showing a group of cells constituting the closed region for expansion or contraction.

FIG. 8 is a drawing showing the appearance of the closed region for expansion or contraction 48. As shown in FIG. 8, the closed region for expansion or contraction 48 is formed by linking and arranging 25 cell images in a matrix of 5 rows and 5 columns. Of the 25 cell images, fences are drawn on the 16 cells arranged along the edges. Fences are not drawn on the remaining 9 cells arranged inside. The compartment lines of each cell in FIG. 8 are not displayed on the actual game screen. The closed region for expansion or contraction 48 thus constructed is displayed on the display 22 using the closed region for expansion or contraction display section 105.

What cell attribute No. is assigned to each cell (mobile cell) constituting the closed region for expansion or contraction 48 is stored in a mobile cell attribute table. Specifically, a cell ID is assigned to each cell constituting the closed region for expansion or contraction 48 as shown in FIG. 9, and the cell ID and the cell attribute No. are made to correspond and stored in the mobile cell attribute table shown in FIG. 10. The cell ID is information identifying the mobile cell. This mobile cell attribute table is previously stored, together with each cell image shown in FIG. 7 in the game cartridge 12, and the CPU 14 obtains a cell attribute number corresponding to each mobile cell from this table when the meadow 44 is expanded or contracted. Cell images for each cell attribute number read out from the game cartridge 12 are then linked and displayed on the display 22. The closed region for expansion or contraction 48 is thus displayed on the region setting screen. The mobile cell attribute table is stored in the second cell attribute storage section 111 in the functional block diagram of FIG. 3.

Figures 11, 12:
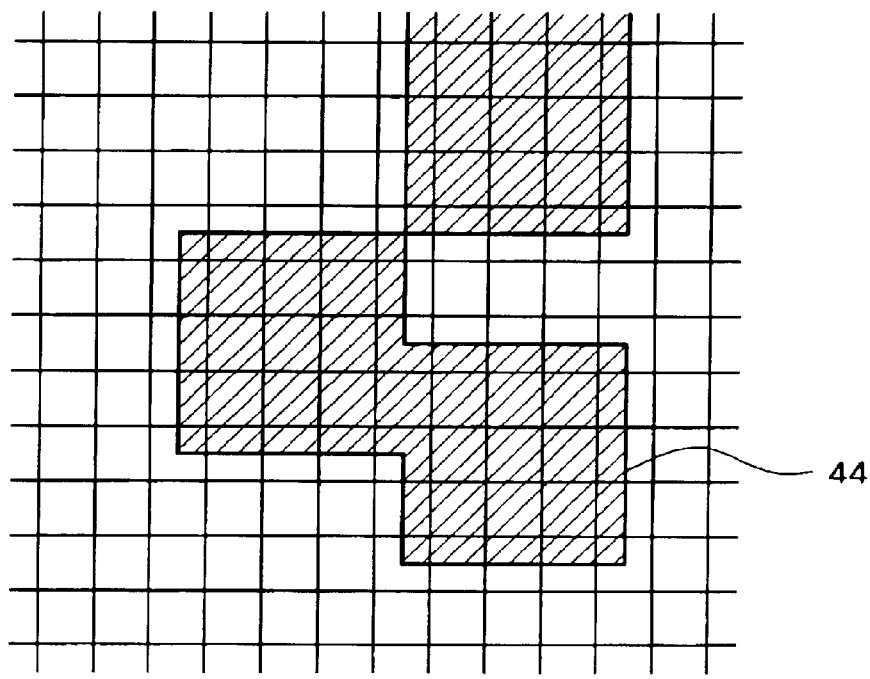
FIG. 11 is a drawing showing expansion of an image of a base region (plain) including the expansion or contraction object region (meadow).
FIG. 12 is a drawing showing a fixed cell attribute table.

Similarly, what cell attribute No. has been assigned to each cell (fixed cell) constituting the plain 46 is stored in a fixed cell attribute table. That is, as shown in FIG. 11, the plain 46 is made up of numerous cell images linked and arranged, and a cell ID is assigned to each fixed cell. The CPU 14 generates the fixed cell attribute table shown in FIG. 12 and stores this table in the RAM 16, and the plain 46 is displayed on the display 22 while referring to this fixed cell attribute table. The fixed cell attribute table is stored in the first cell attribute storage section 107 in the functional block diagram of FIG. 3.

The fixed cell attribute table shown in FIG. 12 stores the cell IDs, cell coordinates and cell attribute number in a corresponding manner. The cell ID identifies each fixed cell constituting the plain 46, while a cell coordinate is information specifying the position of each fixed cell. For example, coordinates of the centers and corners of each fixed cell in a game field are stored in the fixed cell attribute table as cell coordinates. At a stage where a meadow 44 has not yet been established in the plain 46, in the fixed cell attribute table "14", (outside meadow) is set for the cell attribute numbers corresponding to all cell IDS. If a player then establishes a meadow 44, cell attribute No's other than "14" are set in the fixed cell attribute table.

As has been described above, when the meadow 44 is expanded or contracted, a player moves the closed region for expansion or contraction 48 using the cross-shaped key 38, and overlaps of fellow cells slide up, down, left or right one at a time. In a state where the closed region for expansion or contraction 48 is brought into contact with the meadow 44 and the fences of the two regions overlap, if button 42A, for example, is pressed down the two regions will be joined, so as to expand the meadow 44. At this time, new cell attribute numbers for each fixed cell constituting the plain 46 are derived from cell attribute numbers of overlapping cells, based on a cell attribute conversion table that will be described next.

FIG. 13 is a drawing showing the cell attribute conversion table in question. As shown in FIG. 13, the cell attribute conversion table is a combination of, a combination of cell attribute numbers of mobile cells constituting the closed region for expansion or contraction 48 and current cell attribute numbers of fixed cells constituting the plain 46, and new cell attribute numbers of those fixed cells. By referring to the cell attribute conversion table, it is possible to easily obtain new cell attribute numbers for those fixed cells from the cell attribute numbers of mobile cells and fixed cells that are overlapping. For example, in a state where a fixed cell having cell attribute number 4 and a mobile cell having cell attribute number 8 are overlapping, if the button 42A is pressed down (expansion operation), the cell attribute of that fixed cell will be changed to "13". In this way, if the cell attribute numbers of each cell are changed, that content is reflected in the fixed cell attribute table (FIG. 11) prepared in RAM 16 for the plain 46. The cell attribute conversion table is stored in the cell attribute conversion table storage section 109 in the functional block diagram of FIG. 3.

Also, in the same drawing, in the case where "−1" is stored as a new cell attribute number, the fact that region expansion is prohibited with that combination of fixed cell attribute number and mobile cell attribute number can be indicated. This is so as to only allow expansion of the meadow 44 in a state where the closed region for expansion or contraction 48 is brought into contact with the meadow 44 and the fences of the two regions overlap.

Figure 14:
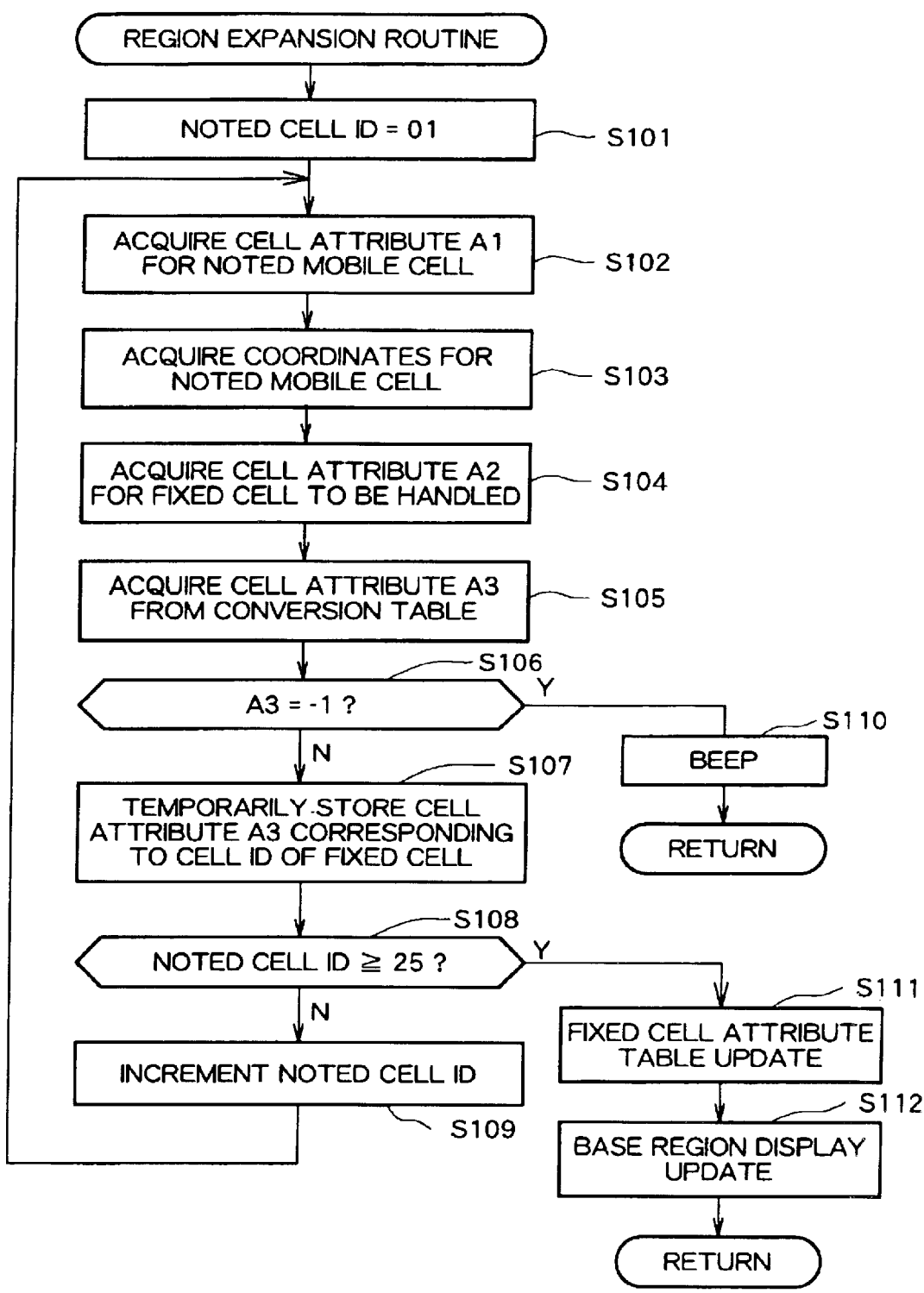
FIG. 14 is a flowchart for describing region expansion processing.

FIG. 14 is a flowchart for describing region expansion processing in the portable game machine 10. The region expansion processing shown in FIG. 14 is executed by the expanded or contracted region determination section 108, including the cell attribute conversion table storage section 109 and the new cell attribute derivation section 110, when a player performs an expansion operation, such as moving the closed region for expansion or contraction 48 using the cross-shaped key 38 and then pressing the button 42A. As shown in FIG. 14, in this processing, first of all "01" is set as the cell ID (noted cell ID) of a mobile cell in question (noted mobile cell) (S101). Then, a cell attribute number corresponding to the noted cell ID is obtained from the mobile cell attribute table (FIG. 9), and stored in variable A1 (S102). Coordinates of the noted mobile cell of the game field are also obtained (S103) and a cell attribute number corresponding to these coordinates is obtained from the fixed cell attribute table (FIG. 11). The obtained cell attribute number is then stored in variable A2 (S104). Next, referring to the cell attribute conversion table, a new cell attribute number is obtained from the combination of the variable A1 and the variable A2, and this new cell attribute number is stored in variable A3 (S105). If this variable A3 is −1 (S106), an indication that expansion of the meadow 44 is prohibited at the current position of the closed region for expansion or contraction 48 is notified to the player by issuing an alarm such as a beep sound (S110), and processing terminates. In this case, the player re-established the position (expansion or contraction position) of the closed region of expansion or contraction 48.

On the other hand, if it is determined in step S106 that variable A3 is not −1, variable A3 is made to correspond to the cell ID of the fixed cell corresponding to the coordinates obtained in S103, and temporarily stored in RAM 16. Then the noted cell ID is incremented by one (S109) and the above processing is repeated until the noted cell ID reaches 25 (S108). If the noted cell ID then reaches 25, the contents temporarily stored in the RAM 16 in S107 are reflected in the fixed cell attribute table (FIG. 11) (S111), and the plain 46 is re-drawn on the game screen based on this updated fixed cell attribute table (S112). With the processing described above, the meadow 44 can be expanded with a comparatively light processing load.

Figure 15:
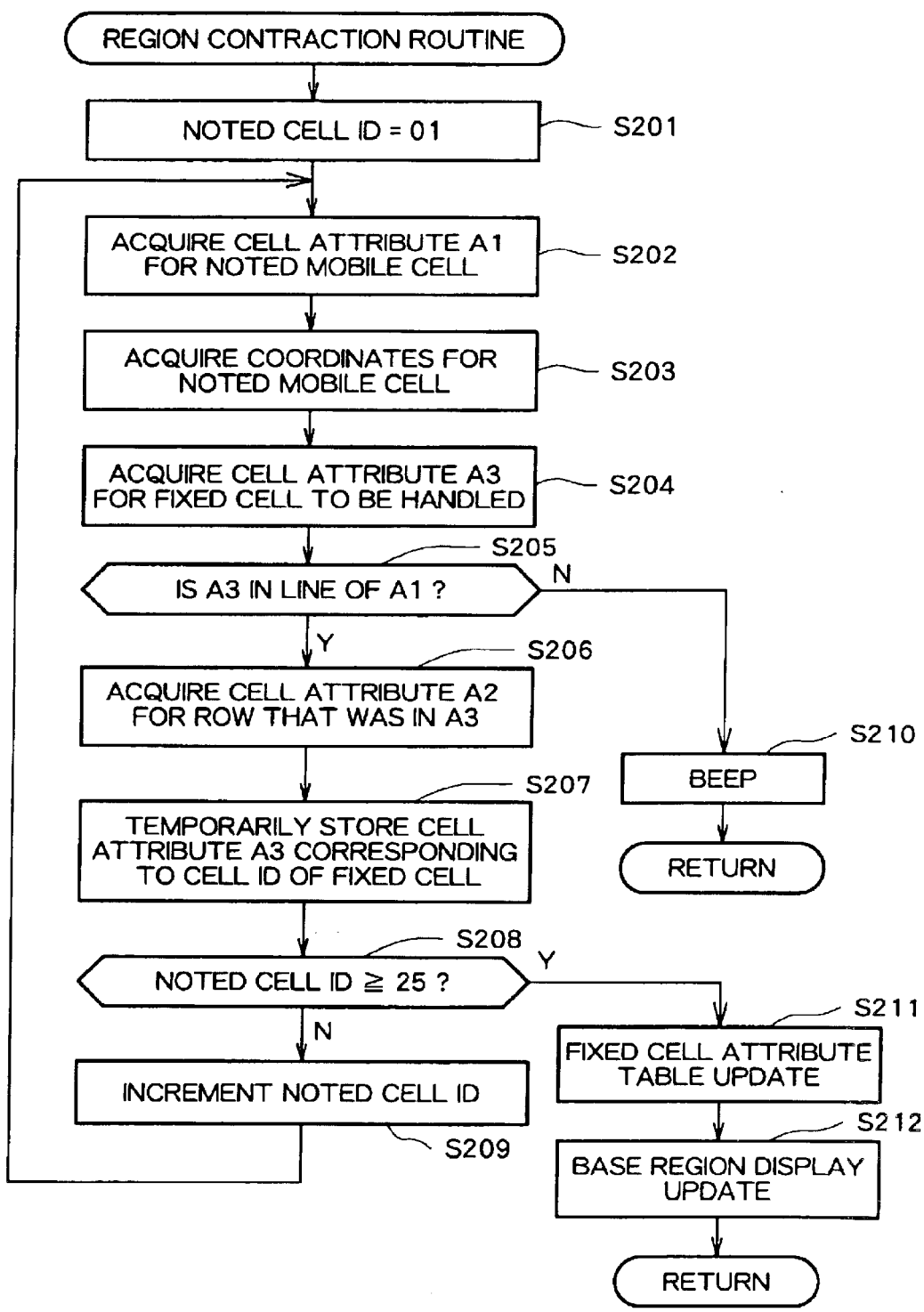
FIG. 15 is a flowchart for describing region contraction processing.

Next, FIG. 15 is a flowchart for describing region contraction processing for the portable game machine 10. The region contraction processing shown in FIG. 15 is executed by the expanded or contracted region determination section 108, including the cell attribute conversion table storage section 109 and the new cell attribute derivation section 110, when a player performs a contraction operation, such as moving the closed region for expansion or contraction 48 using the cross-shaped key 38 and then pressing the button 42B. As shown in FIG. 15, with this processing first of all a noted cell ID is set to "01", (S201). Then, a cell attribute number corresponding to the noted cell ID is obtained from the mobile cell attribute table (FIG. 9) and stored invariable A1 (S202). Coordinates of the noted mobile cell of the game field are also obtained (S203), and a cell attribute number corresponding to those coordinates is obtained from the fixed cell attribute table (FIG. 11). The obtained cell attribute is then stored in variable A3 (S204). Next, with reference to the cell attribute conversion table, it is checked whether a cell attribute number that is the same as variable A3 is contained in the line of variable A1 (S205). Then, if the same cell attribute number is not contained, indication that contraction of the meadow 44 is prohibited at the current position of the closed region for expansion or contraction 48 is notified to the player by emission of an alarm sound such as a beep (S210) and processing terminates. In this case, the player re-establishes the position of the closed region for expansion or contraction 48 (expansion or contraction position).

On the other hand, if a cell attribute number the same as variable A3 is contained in the line of variable A1 of the cell attribute conversion table in S205, the cell attribute number for that row (numerical value stored in the uppermost line) is stored in variable A2 (S206). In S203, variable A2 is then corresponding to the cell ID of the fixed cell corresponding to the acquired coordinates, and temporarily stored in RAM 16 (S207). After that, the noted cell ID is incremented by one (S209) and the above processing is repeated until the noted cell ID reaches 25 (S208). If the noted cell ID then reaches 25, the contents temporarily stored in the RAM 16 in S207 are reflected in the fixed cell attribute table (FIG. 11) (S211), and the plain 46 is re-drawn on the game screen based on this updated fixed cell attribute table (S212). With the processing described above, it is possible to contract the meadow 44 with a comparatively light processing load.

With the procedures described above, it is possible to freely expand or contract a meadow 44 by manipulating the closed region for expansion or contraction 48 with the cross-shaped key 38 and a simple expansion or contraction operation of pressing the button 42A or 42B. As a result, even if operating means is comparatively insubstantial, as with the portable game machine 10, suitable expansion or contraction of regions is made possible.

The present invention is not limited to the above described embodiments.

For example, as described above, the closed region for expansion or contraction 48 is displayed on a region setting screen as an expansion or contraction position mark for player to indicate a position of expansion or contraction of the meadow 44, but it is also possible to simply display only a fence surrounding the closed region for expansion or contraction 48 as the expansion or contraction position mark, or to display another mark as the expansion or contraction position mark.

Also, in the above description the cell attribute conversion table of FIG. 10 is used in both region expansion processing (FIG. 14) and region contraction processing (FIG. 15), but it is possible to prepare separate cell attribute conversion tables.

In the description above, new fixed cell attribute numbers are derived from a combination of cell attribute numbers for fixed cells and mobile cells using the sell attribute conversion table, but it is also possible to adopt a different method. For example, if each cell is divided into four small square regions, namely upper right, upper left, lower right and lower left, and each bit of 4-bit data set to "1" if the closed region for expansion or contraction 48 or meadow 44 exists in each small region, or set to "0" if it does not exist, it is possible to simply derive new cell attribute information for the fixed cells from cell attribute information for fixed cells and cell attribute information for mobile cells using this 4-bit data as cell attribute information. Specifically, an OR operation of the two items of cell attribute information results in new cell attribute information for a fixed cell in the case of region expansion. If an AND operation of the two items of cell attribute information at this time results in any value other than "0000" it can be determined that arrangement is impossible (fences of the closed region for expansion or contraction 48 and the meadow 44 are not overlapping). Similarly, an EXCLUSIVE-OR of the two items of cell attribute information results in new cell attribute information for fixed cells in the case of region contraction.

Further, in the above description, a player expands or contracts the meadow 44 to expand a game involving the meadow 44, but it is possible to apply the present invention to other types of game as well. That is, it is possible to apply the present invention to various types of games where a player arbitrarily expands or contracts a region established in a game space using the cross-shaped key 38 to cause advancement of a game involving that region.

Also, an example has been given in the above description where the present invention is applied to a game where a two dimensional region is established in a plain and that region is expanded or contracted, but it is also possible to apply the present invention to a game where a three dimensional region is established in a space and the region expanded or contracted.

Figure 17A:
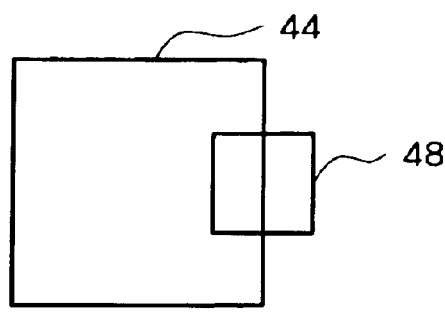
FIGS. 17a and 17b are schematic diagrams showing one example of region contraction processing.
Figure 17B:
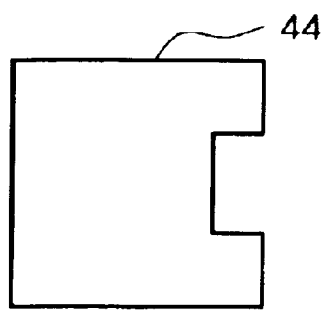

In the description above, it is only possible to expand or contract the meadow if fences overlap at the meadow 44 and the closed region for expansion or contraction 48, but it is also possible to expand or contract the meadow 44 in other cases. In this case, as shown in FIG. 16a, if an expansion operation is carried out with part of the closed region for expansion or contraction 48 overlapping the meadow 44, it is preferable, as shown in FIG. 16b, for that part of the closed region for expansion or contraction 48 that is not overlapping the meadow 44 to be added to the meadow 44. Also, as shown in FIG. 17a, if a contraction operation is carried out with part of the closed region for expansion or contraction 48 overlapping the meadow 44, it is preferable, as shown in FIG. 17b, to remove that part of the closed region for expansion or contraction 48 that overlaps the meadow 44 from the meadow 44. FIG. 18 is a drawing showing a cell attribute conversion table (for region expansion) used in this type of case where there are no limitations on providing the expansion or contraction region position. This cell attribute conversion table is also stored in the cell attribute conversion table storage section 109 in the functional block diagram of FIG. 3.

Figure 19:
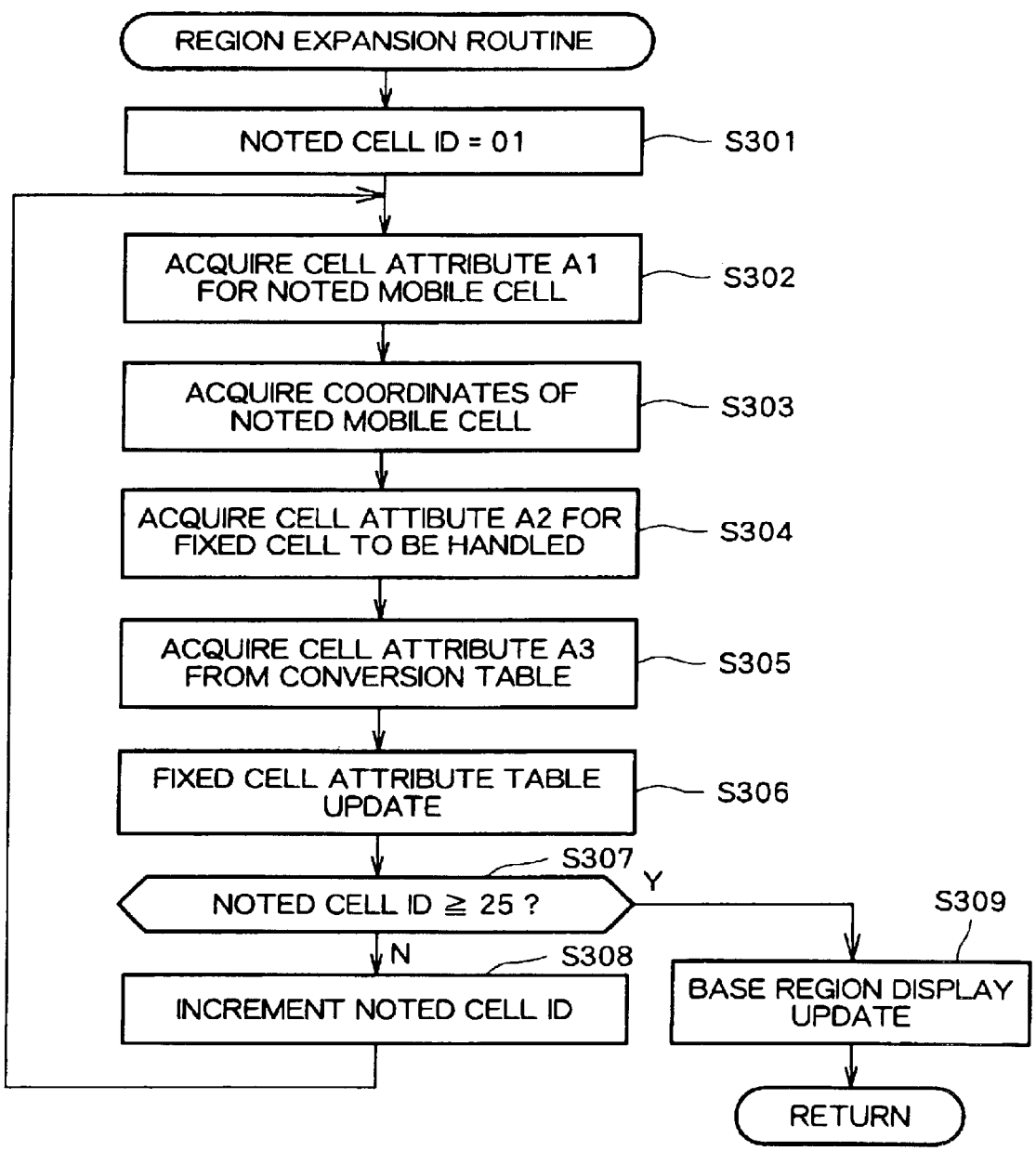
FIG. 19 is a flowchart for describing a modified example of region expansion processing.

FIG. 19 is a flowchart for describing processing for expanding the meadow 44 using the closed region for expansion or contraction 48 when there is no limitation on the expansion or contraction position, using the cell attribute conversion table in question. This processing is executed using the expanded or contracted region determination section 108 including the cell attribute conversion table storage section 109 and the new cell attribute derivation section 110. In FIG. 19, S301 to S305 are respectively the same processing as S101 to S105. With this processing, −1 is not contained in a new cell attribute number obtained from the cell attribute conversion table, a if new cell attribute number is acquired in S305, that new attribute number is immediately reflected in the fixed cell attribute table (FIG. 11) (S306). The noted cell ID is then incremented by one (S308) and the processing of S301 to S306 is repeated until the noted cell ID reaches 25 (S307). If the noted cell ID then reaches 25, the plain 46 is re-drawn on the game screen based on this updated fixed cell attribute table (S309). In this way, it is possible to expand the meadow 44 using the closed region for expansion or contraction 48 at an arbitrary position. In a similar manner, it is possible to contract the meadow 44 using the closed region for expansion or contraction 48 at an arbitrary position, by preparing a cell attribute conversion table for region contraction.

What is claimed is:

1. A game device, for allowing development of a game involving an expansion/contraction object region included in a base region expanded or contracted by a player, comprising:

first cell attribute storage means for storing a cell attribute representing a positional relationship of the expansion/contraction object region corresponding to each cell constituting the base region;

base region display means for displaying the base region on a game screen based on a cell attribute of each cell constituting the base region stored in the first cell attribute storage means;

second cell attribute storage means for storing cell attributes representing a relationship of a closed region for expansion or contraction corresponding to each cell constituting the closed region for expansion or contraction;

expansion/contraction mark display means for displaying an expansion/contraction position mark representing a position for adding the closed region for expansion or contraction to the expansion/contraction object region or a position for removing the closed region for expansion or contraction from the expansion/contraction object region on the game screen;

position changing means for changing a relative position of the expansion/contraction position mark with respect to the base region in accordance with a command from a player, so as to generate correspondence between each cell constituting the base region and each cell constituting the closed region for expansion/contraction;

new cell attribute derivation means for deriving new cell attributes for each cell constituting the base region based on cell attributes of each corresponding cell; and base region re-display means for displaying the base region on the game screen based on the derived new cell attributes.

2. The game device of claim 1, further comprising:

cell attribute translation table storage means for storing a cell attribute translation table making it possible to generate correspondence between a combination of cell attributes of each cell constituting the base region and cell attributes of each block constituting the closed region for expansion or contraction, and the new cell attributes, and wherein the new cell attribute derivation means derives new cell attributes for each block constituting the base region based on the cell attribute translation table.

3. A region expansion/contraction method, for a game involving an expansion/contraction object region, included in a base region, expanded or contracted by a player, comprising the steps of:

storing cell attributes representing a positional relationship of the expansion/contraction object region corresponding to each cell constituting the base region;

displaying the base region on the game screen based on cell attributes for each cell constituting the base region;

storing cell attributes representing a relationship of a closed region for expansion or contraction corresponding to each cell constituting the closed region for expansion or contraction;

displaying an expansion/contraction position mark representing a position for adding the closed region for expansion or contraction to the expansion/contraction object region or a position for removing the closed region for expansion or contraction from the expansion/contraction object region on the game screen;

changing a relative position of the expansion/contraction position mark with respect to the base region in accordance with a command from a player so as to generate correspondence between each cell constituting the base region and each cell constituting the closed region for expansion or contraction;

deriving new cell attributes for each cell constituting the base region based on cell attributes of each corresponding cell; and displaying the base region on the game screen based on the derived new cell attributes.

4. An information storage medium having a game program for causing a computer to function as a game device, for allowing development of a game involving an expansion/contraction region included in a base region expanded or contracted by a player, the game program causing the computer to function as:

first cell attribute storage means for storing cell attributes representing a positional relationship of the expansion/contraction object region corresponding to each cell constituting the base region+;

base region display means for displaying the base region on a game screen based on cell attributes of each cell constituting the base region stored in the first cell attribute storage means;

second cell attribute storage means for storing cell attributes representing a relationship of a closed region for expansion or contraction corresponding to each cell constituting the closed region for expansion or contraction;

expansion or contraction position mark display means for displaying an expansion/contraction position mark, representing a position for adding the closed region for expansion or contraction to the expansion/contraction object region or a position for removing the closed region for expansion or contraction from the expansion/contraction object region, on the game screen;

position changing means for changing a relative position of the expansion/contraction position mark with respect to the base region, in accordance with a command from a player, so as to generate correspondence between each cell constituting the base region and each cell constituting the closed region for expansion or contraction;

new cell attribute derivation means for driving new cell attributes for each cell constituting the base region based on cell attributes of each corresponding cell; and base region re-display means for displaying the base region on the game screen based on the derived new cell attributes.

* * * * *